United States Patent
Havinis et al.

(10) Patent No.: US 6,169,899 B1
(45) Date of Patent: Jan. 2, 2001

(54) SYSTEM AND METHOD FOR PROVIDING HISTORICAL DATA FOR LOCATION SERVICES

(75) Inventors: Theodore Havinis, Plano; Dimitris Papadimitriou, Richardson; Maya Roel-Ng, Plano, all of TX (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/151,574

(22) Filed: Sep. 11, 1998

(51) Int. Cl.[7] ........................................ H04Q 7/00
(52) U.S. Cl. .......................... 455/433; 455/435; 455/458
(58) Field of Search ................................. 455/422, 432, 455/433, 435, 434, 458, 560, 517, 456, 457

(56) References Cited

U.S. PATENT DOCUMENTS

| | | | |
|---|---|---|---|
| 5,153,902 | * 10/1992 | Buhl et al. | 455/458 |
| 5,369,681 | * 11/1994 | Boudreau et al. | 455/458 |
| 5,991,620 | * 11/1999 | Kingdon et al. | 455/432 |

* cited by examiner

Primary Examiner—Thanh Cong Le
(74) Attorney, Agent, or Firm—Jenkens & Gilchrist, P.C.

(57) ABSTRACT

A telecommunications system and method for providing location information consist of either real-time data or historical data when the subscriber requested to be positioned is either absent or not reachable, to a requesting location application (LA). The historical data is preferably stored per subscriber in a database within a serving Mobile Switching Center/Visitor Location Register (MSC/VLR) following a successful positioning of that subscriber. This historical data can consist of the location information along with a time stamp indicating the time that the location information was obtained and stored in the MSC/VLR. The age of the location information can then be calculated by determining the difference between the current read value of the system clock and the value of the time stamp information stored in the MSC/VLR for that particular location information.

26 Claims, 5 Drawing Sheets

SYSTEM AND METHOD FOR PROVIDING HISTORICAL DATA FOR LOCATION SERVICES

BACKGROUND OF THE PRESENT INVENTION

1. Field of the Invention

The present invention relates generally to telecommunications systems and methods for positioning a mobile terminal within a cellular network, and specifically to providing historical data for location services.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the mobile terminal 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

As can be seen in FIG. 2 of the drawings, upon a network positioning request, positioning of an MS 200 can be performed by several BTS's (210, 220 and 230) generating positioning data, which can then be delivered, via the MSC/VLR 260, to a Mobile Location Center (MLC) 270 for calculation of the geographical location of the MS 200. The geographical location of the MS 200 can then be sent to a Location Application (LA) 280 that requested the positioning. Alternatively, the requesting LA 280 could be located within the MS 200 itself, within the MSC/VLR 260 or could be an external node, such as an Intelligent Network (IN) node (not shown).

In order to accurately determine the location of the MS 200, positioning data from three or more separate BTS's (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the MS 200 can be determined (with certain accuracy) by the MLC 270.

However, in many instances, the subscriber being positioned is not currently registered with an MSC/VLR 260 or has deactivated the MS 200, e.g., turned the power off, and therefore positioning of the MS 200 is not possible. In this situation, even though a real-time positioning of the MS 200 cannot occur, the requesting LA 280 may still desire to know the last known location of the MS 200. Therefore, even though the location information may not be entirely accurate, the LA 280 can at least have an idea of the location of the MS 200, which can be helpful in many situations.

For example, if the requesting LA 280 is a law enforcement agency, and the subscriber being positioned is a known criminal or paroled prisoner, the last known location of the MS 200 associated with this criminal or paroled prisoner may be helpful in either tracking down the criminal or assuring the agency that the prisoner has not violated the terms of his parole, e.g., by leaving a designated area. Therefore, there is a need for a system and method of providing location information to the requesting LA 280 even if the subscriber being positioned is either absent or not reachable.

It is, therefore, an object of the present invention to implement a mechanism to provide location information along with the age of that location information to the requesting location application even if the mobile terminal to be positioned is not currently reachable, and therefore, current location information is not available.

SUMMARY OF THE INVENTION

The present invention is directed to telecommunications systems and methods for providing location information, which can consist of either real-time data or historical data when the subscriber requested to be positioned is either absent or not reachable, to a requesting LA. In addition, the age of the location information can be included to indicate to the requesting LA the reliability of the location information. The historical data is preferably stored per subscriber in the serving MSC/VLR following a successful positioning of that subscriber. This historical data can consist of the location information along with a time stamp indicating the time that the location information was obtained and stored in the MSC/VLR. The age of the location information can then be calculated by determining the difference between the current read value of the system clock and the value of the time stamp information stored in the MSC/VLR for that particular location information. It should be noted that if the provided location information is real-time data, then the age of the location information can be set to zero.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
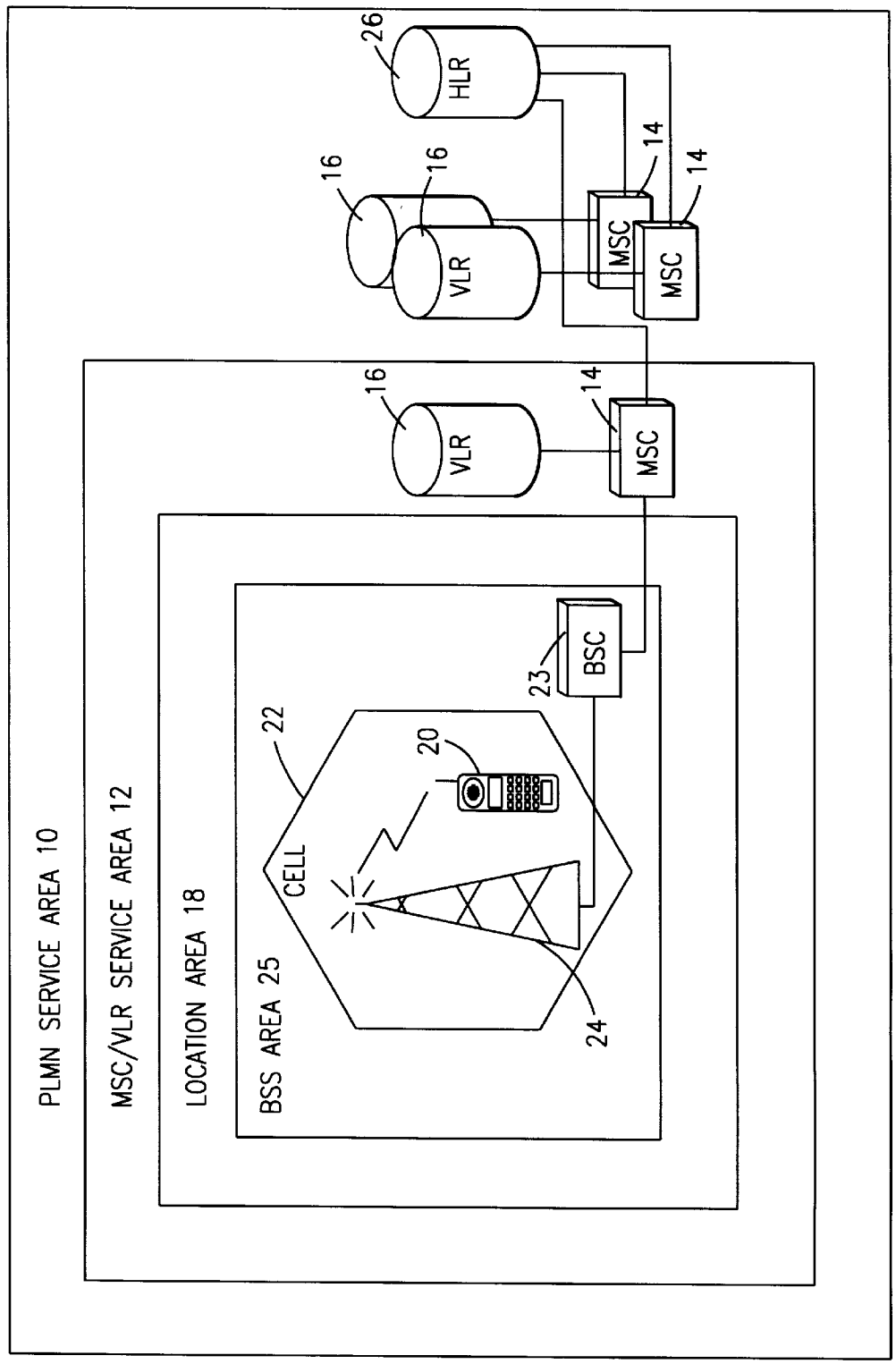
FIG. 1 is a block diagram of a conventional wireless telecommunications system.
Figure 2:
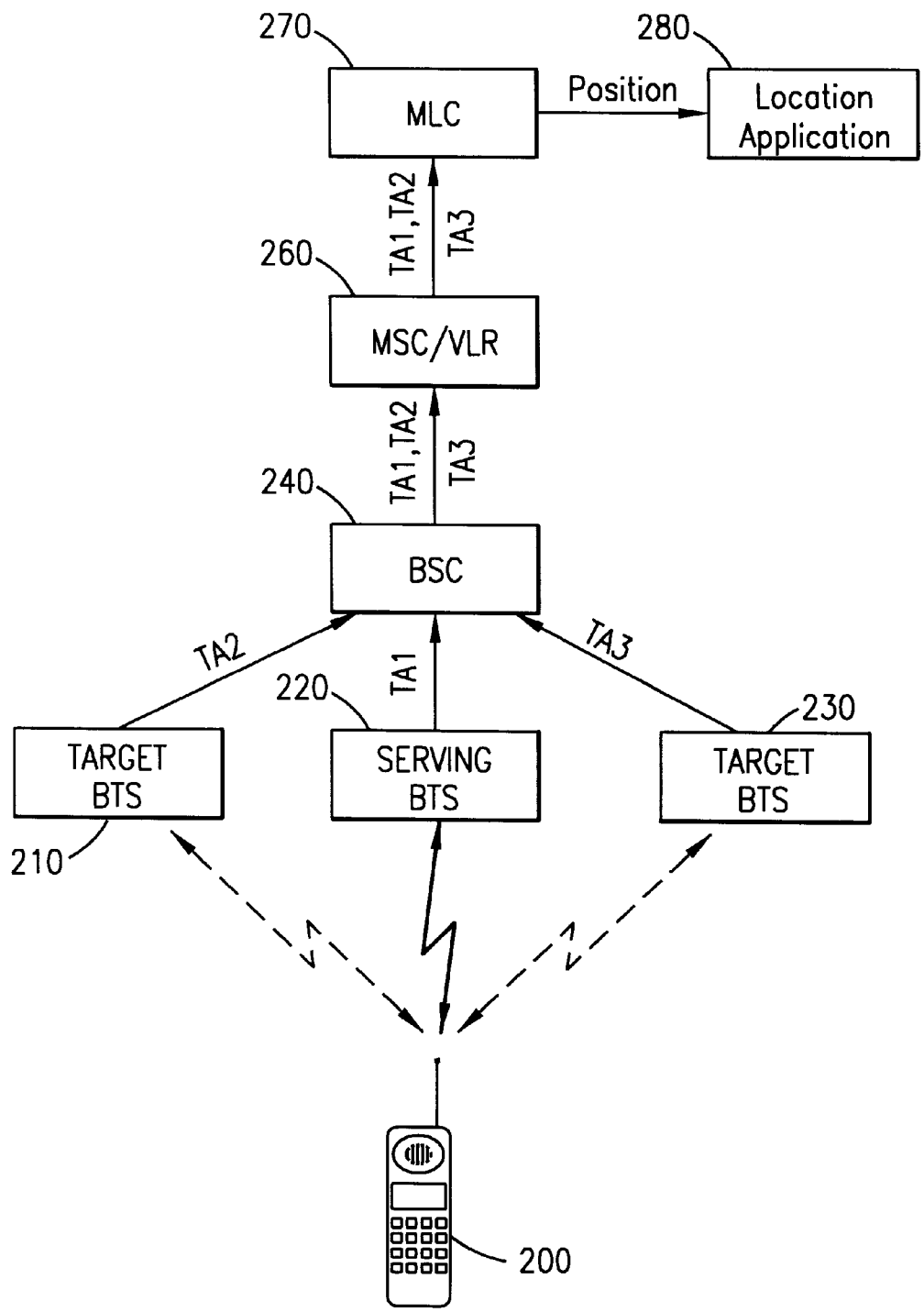
FIG. 2 illustrates a sample positioning of a mobile terminal in which positioning data is acquired and transmitted to a mobile location center to determine the location of that mobile terminal.
Figure 3:
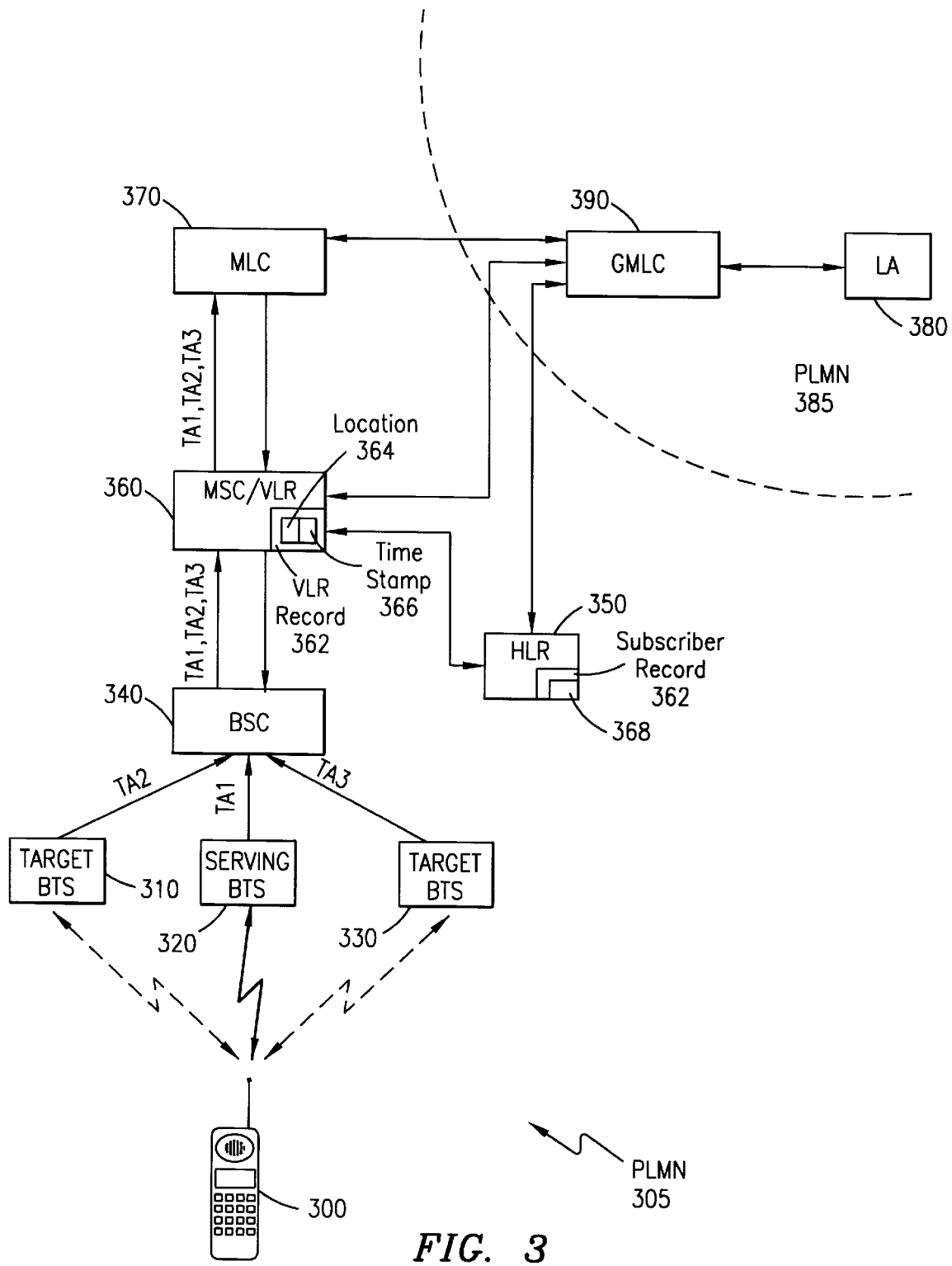
FIG. 3 is a block diagram showing the storage of historical location information along with time stamp information within a serving MSC/VLR for use in providing such location information and the associated age of that information to a requesting location application in accordance with preferred embodiments of the present invention.

With reference now to FIG. 3 of the drawings, when a Location Application (LA) 380 sends a request for location services for a particular mobile subscriber to a Gateway Mobile Location Center (GMLC) 390 serving the Public Land Mobile Network (PLMN) 385 that the LA 380 is located in, the GMLC 390 can return to the LA 380 either real-time location data or historical location data (in case that mobile subscriber is absent or not reachable at the time the positioning request is received). Real-time data consists of data returned to the LA 380 after the mobile subscriber was successfully positioned as a result of the request for location information sent by the LA 380. Historical data, on the other hand, consists of the last available location information along with the age of that location information.

In order to provide historical location information, every time the location of a Mobile Station (MS) 300 is calculated, a serving Mobile Switching Center/Visitor Location Register (MSC/VLR) 360 can store the location information 364 and a time stamp 366 in the subscriber's VLR record 362. Thereafter, when another positioning request is received for that MS 300, and the MSC/VLR 360 determines that subscriber is not available for positioning, this stored location information 364 along with the age of the location information 364 can be sent to the requesting LA 380. The age of the location information 364 can be calculated by the GMLC 390 determining the difference between the current read value of the system clock when the positioning request is received and the time stamp 366 stored in the subscriber's VLR record 362 in the MSC/VLR 360. The age of the location information 364 can be used by the LA 380 as an indication of the reliability of the location information 364. However, it should be understood that if the provided location information 364 is real-time data, then the age of the location information 364 can be set to zero.

Figure 4A:
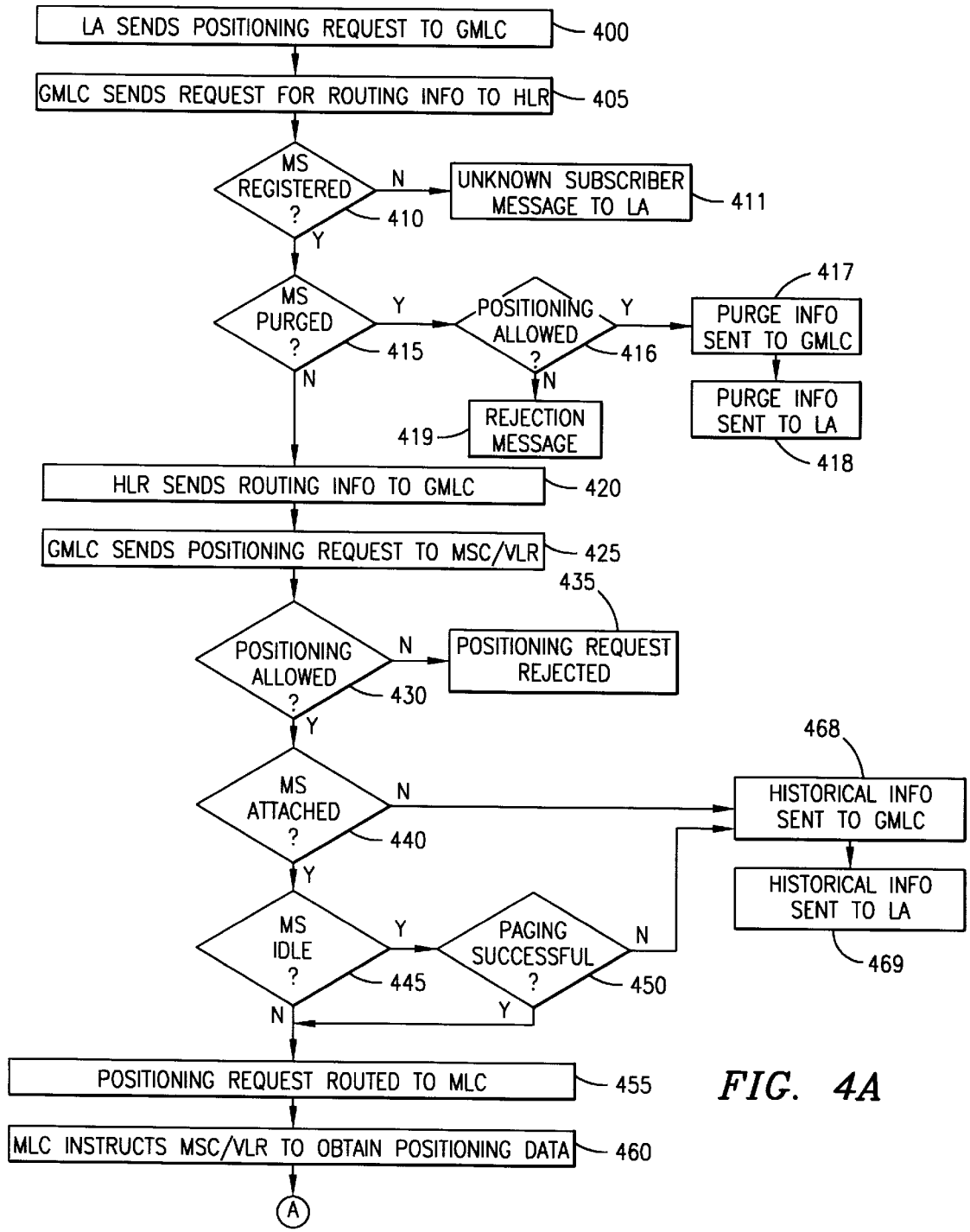
FIGS. 4A and 4B shows steps in a sample process for implementing the embodiment described in FIG. 3.
Figure 4B:
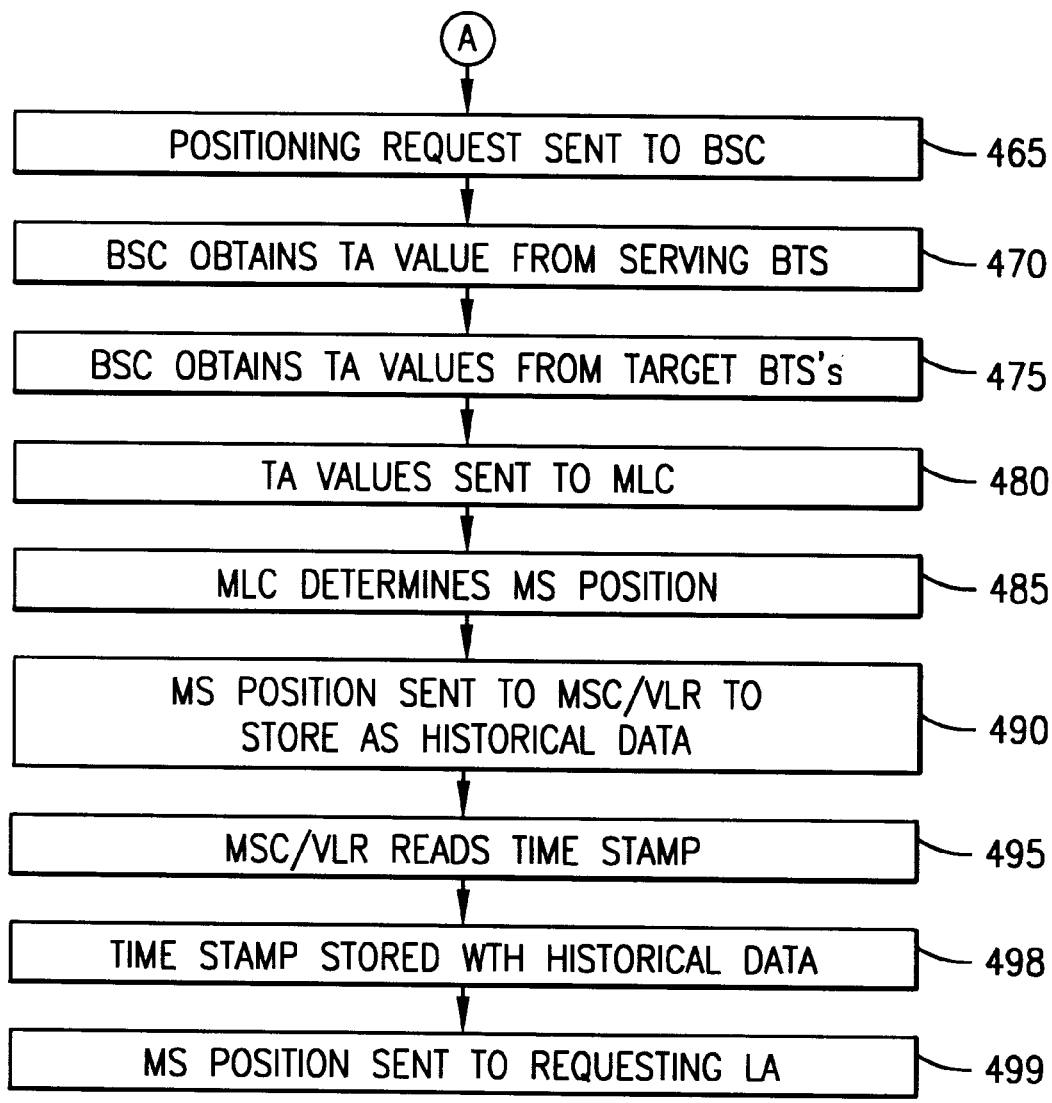

The historical data or real-time data can be obtained using various positioning methods. As an example, within a GSM system, positioning of a particular MS 300 can be performed by collecting positioning data, e.g., Timing Advance (TA) values TA1, TA2 and TA3 from several Base Transceiver Stations (BTS's) (310, 320 and 330) from which the geographical location, e.g., x, y coordinates, of the MS 300 can be calculated. With reference now to FIGS. 4A and 4B of the drawings, positioning of a particular MS 300 typically begins by the requesting LA 380 sending a positioning request, which specifies the particular Mobile Station International Subscriber Identity Number(s) (MSISDN) associated with the particular MS 300 to be positioned, to the GMLC 390 within the PLMN 385 of the LA 380 (step 400).

When the GMLC 390 receives the positioning request (step 400), the GMLC 390 can then send a request for routing information (step 405), e.g., the address of the MSC/VLR 360 serving the PLMN 305 that the MS 300 is currently located in, to the MS's 300 Home Location Register (HLR) 350, using the MS's 300 directory number as a global title. The signaling network, e.g., the Signaling System #7 (SS7) network (not shown), can perform a global title translation on the MSISDN and route the request to the appropriate HLR 350 for the MS 300.

The HLR 350 then checks its records to confirm that the MS 300 is registered in the HLR 350 (step 410), and that the MS 300 has not been "purged" from the MSC/VLR 360 records (step 415). If the MS 300 is registered in the HLR 350 (step 410) and the MS 300 has not been "purged" from the MSC/VLR 360 records (step 415), the routing information, e.g., the serving MSC/VLR 360 address is sent to the GMLC 390 (step 420).

However, if the MS 300 is not registered in the HLR 350 (step 410), the HLR 350 sends a rejection message to the GMLC (step 412) indicating "Unknown Subscriber." If the MS 300 is registered (step 410), but has been "purged" from the MSC/VLR 360 records (step 415), the HLR 350 then checks the subscriber's privacy settings stored in the subscriber's HLR records 362, and if positioning is allowed (step 416), the HLR 350 can then send a message indicating that the subscriber is purged, along with a purge time stamp 368 and the last known MSC/VLR 360 address, to the GMLC 390 (step 417). The GMLC 390 can then send to the LA 380 an indication that the subscriber is purged, the elapsed time since the HLR 350 marked the subscriber as purged as determined from the purge time stamp 368 and the last known MSC/VLR 360 address (step 418). If the GMLC 390 has a table (not shown) therein that allows the translation of the MSC/VLR 360 address to geographical information, e.g., x, y coordinates of the MSC/VLR 360, the GMLC 390 can also send that geographical information to the LA 380. However, if positioning is not allowed (step 416), the HLR 350 can send a rejection message along with an "Absent Subscriber" message to the LA 380 via the GMLC 390 (step 419).

When the GMLC 390 receives the routing information (step 420), the GMLC then sends the positioning request to the serving MSC/VLR 360 (step 425), using the MSC/VLR 360 address. The MSC/VLR 360 then verifies that positioning of the MS 300 is allowed (step 430), e.g., by checking the subscriber's privacy settings stored in the subscriber's record (database) 362 in the MSC/VLR 360 and the privacy override capabilities of the requesting LA 380, which were sent by the GMLC 390 along with the positioning request. If the MS 300 does not allow positioning (step 430), the positioning request is rejected and a rejection message is sent to the LA 380 via the GMLC 390 (step 435).

However, if the MS 300 does allow positioning (step 430), the MSC/VLR 360 then verifies that the MS 300 is attached to the network by confirming that the MS 300 has not sent an IMSI detach message, which occurs when the MS 300 powers off, or that the MS 300 has not been implicitly detached by failing to send the periodic registration to the MSC/VLR 360 (step 440). In addition, the MSC/VLR 360 also checks whether the MS 300 is currently in idle mode, e.g., the MS 300 is not engaged in a call connection (step 445). If the MS 300 is attached to the network (step 440) and is currently in idle mode (step 445), the serving MSC/VLR 360 must first page the MS 300 to obtain the cell id (step 450) before routing the positioning request and cell id to the MLC 370 serving the PLMN 305 that the MS 300 is located in (step 455). If the MS 300 is attached to the network (step 440) and is currently in dedicated mode (step 445), the cell id already known, and the MSC/VLR 360 can then route the positioning request and cell id directly to the MLC 370 (step 455). It should be understood that the MLC 370 can be co-located with the serving MSC/VLR 360 or can be a separate node, the latter being illustrated.

However, if the serving MSC/VLR 360 determines that the MS 300 is detached from the network (step 440) or if paging is not successful (step 450) when the positioning request is received, the MSC/VLR 360 can send to the GMLC 390 the available historical location data 364 and time stamp 366 stored in the subscriber record 362 within the MSC/VLR 360 from a previous successful positioning of the MS 300, along with any other location information parameters currently supported in the MSC/VLR 360, e.g., location number, cell id, location area identity and/or VLR number (step 468). The received historical location information 364 along with the determined age of the historical data can then be sent to the requesting LA 380 from the GMLC 390 (step 469).

Once the MLC 370 receives the positioning request (step 455), the MLC 370 can then send a request to initiate positioning of the MS 300 to the MSC/VLR 360 (step 460), instructing the MSC/VLR 360 to obtain positioning data associated with the location of the MS 300 corresponding to the selected positioning method. The MSC/VLR 360 can then forward the positioning request to the BSC 340 (step 465). When the serving BSC 340 receives the positioning request (step 465), the BSC 340 then determines which BTS 320 is currently serving the MS 300, and obtains a Timing Advance (TA) value (TA1), or other positioning data, from this serving BTS 320 (step 470), if possible. Thereafter, TA values are obtained from at least two target BTSs (310 and 330) (step 475) by performing a positioning handover. If the serving BTS 320 does not support positioning, an additional target BTS (not shown) must be selected. It should be noted that positioning of the MS 300 can be performed using more than three BTSs (310, 320, and 330).

The TA values (TA2 and TA3) measured by the target BTS's (310 and 330), together with the TA value TA1 obtained from the serving BTS 320, are then transmitted by the serving BSC 340 to the serving MLC 370 via the MSC/VLR 360 (step 480) to determine the location of the MS 300 using a triangulation algorithm (step 485). This location information can then be sent to the serving MSC/VLR 360 to be stored as historical data 364 in the subscriber record 362 associated with the MS 300 within the MSC/VLR 360 (step 490). When the location information 364 is stored in the MSC/VLR 360 (step 490), the MSC/VLR 360 also reads a time stamp 366 (step 495) and stores it (step 498) along with the location information 364 (step 490). The MSC/VLR 360 can then send the geographical position 364 of the MS 300 along with the time stamp 366 to the GMLC 390, which can then send the position 364 of the MS 300 along with an indication that the age of the location information 364 is zero to the requesting LA (node) 380 (step 499). The stored location information 364 and time stamp 366 remain stored for subsequent positioning requests of the MS 300 when it is not available. It should be noted that the age of the location information 364 can instead be calculated at the MSC/VLR 360 and passed on to the GMLC 390.

It should be understood, however, that any estimate of time, distance, or angle for any cellular system can be used, instead of the TA value discussed herein. For example, the MS 300 can have a Global Positioning System (GPS) receiver built into it, which is used to determine the location of the MS 300. In addition, the MS 300 can collect positioning data based on the Observed Time Difference (OTD) between the time a BTS 320 sends out a signal and the time the MS 300 receives the signal. This time difference information can be sent to the MLC 370 for calculation of the location of the MS 300. Alternatively, the MS 300, with knowledge of the location of the BTS 320, can determine its location.

In an alternative embodiment, in addition to storing the historical data 364 along with the time stamp 366 in the serving MSC/VLR 360, this information 364 and 366 can also be stored within the subscriber's records 362 in the HLR 350. When location information 364 is obtained for a particular MS 300, the MLC 370 or MSC/VLR 360 can forward this information 364 and time stamp 366 to the HLR 350 for storage therein. Thereafter, when a request for routing information is received by the HLR 350 and the HLR 350 determines that the MS 300 has been "purged," the HLR 350 can forward this location information 364 and time stamp 366 to the GMLC 390 instead of sending only the last known MSC/VLR 360 address to the GMLC 390.

In a further alternative embodiment, the location information 364 and time stamp 366 can be stored in the MLC 370 instead of in the MSC/VLR 360. Then, if the MSC/VLR 360 determines that the MS 300 is detached or if paging is not successful, the MSC/VLR 360 can inform the MLC 370 that positioning data cannot be obtained, and the MLC 370 can then send the historical data 364 and the age of that data 364 to the requesting LA 380 via the GMLC 390. Thereafter, when the MS 300 de-registers from the serving MSC/VLR 360, the MSC/VLR 360 can notify the serving MLC 370 of the de-registration and the MLC 370 can then remove the historical data 364 and 366 from its records.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for providing location information for a mobile terminal within a cellular network even when said mobile terminal is not able to be positioned, said telecommunications system comprising:
    a gateway mobile location center for receiving a request for a current positioning of said mobile terminal from a requesting application; and
    a subscriber database for storing both historical location information and an associated time stamp associated with a previous positioning of said mobile terminal, said historical location information being sent from said subscriber database to said gateway mobile location center when said current positioning cannot be performed.

2. The telecommunications system of claim 1, further comprising a mobile switching center/visitor location register (MSC/VLR) in communication with said gateway mobile location center, said MSC/VLR receiving said request for said current positioning of said mobile terminal from said gateway mobile location center and determining whether said current positioning can be performed.

3. The telecommunications system of claim 2, wherein said subscriber database is within said MSC/VLR, said associated time stamp stored within said subscriber database being used by said MSC/VLR to determine an age of said historical location information, said age of said historical location information and said historical location information being forwarded from said MSC/VLR to said requesting application via said gateway mobile location center.

4. The telecommunications system of claim 2, wherein said MSC/VLR obtains positioning data related to the location of said mobile terminal within said cellular network when said MSC/VLR determines that said current positioning can be performed, said positioning data being used to determine real-time location information for said mobile terminal.

5. The telecommunications system of claim 4, wherein said MSC/VLR stores said real-time location information and said associated time stamp within said subscriber database and sends said real-time location information to said gateway mobile location center.

6. The telecommunications system of claim 4, further comprising a serving mobile location center connected to said MSC/VLR, said positioning data being forwarded from said MSC/VLR to said serving mobile location center to determine said real-time location information.

7. The telecommunications system of claim 6, wherein said subscriber database is within said serving mobile location center, said mobile location center storing said real-time location information and said associated time stamp within said subscriber database.

8. The telecommunications system of claim 1, wherein said subscriber database is stored within a home location register associated with said mobile terminal, said home location register being connected to said gateway mobile location center.

9. A telecommunications system for providing location information for a mobile terminal within a cellular network even when said mobile terminal is not able to be positioned, said telecommunications system comprising:
    a gateway mobile location center for receiving a request for a current positioning of said mobile terminal from a requesting application;
    a home location register for storing subscriber information related to said mobile terminal, said gateway mobile location center sending a routing request for routing information to said home location register in response to receiving said request for said current positioning, said home location register checking said subscriber information to determine if said routing information is available and forwarding said routing information to said gateway mobile location center when said routing information is available; and
    a subscriber database for storing both historical location information and an associated time stamp associated with a previous positioning of said mobile terminal, said historical location information being sent from said subscriber database to said gateway mobile location center when said routing information is available and said current positioning cannot be performed.

10. The telecommunications system of claim 9, further comprising a mobile switching center/visitor location register (MSC/VLR) in communication with said home location register, said MSC/VLR receiving said request for said current positioning of said mobile terminal from said gateway mobile location center when said routing information is available, said MSC/VLR determining whether said current positioning can be performed.

11. The telecommunications system of claim 10, wherein said routing information is an address associated with said MSC/VLR.

12. The telecommunications system of claim 10, wherein said subscriber database is within said MSC/VLR, said associated time stamp stored within said subscriber database being used by said MSC/VLR to determine an age of said historical location information, said age of said historical location information and said historical location information being forwarded from said MSC/VLR to said requesting application via said gateway mobile location center.

13. The telecommunications system of claim 11, wherein said MSC/VLR obtains positioning data related to the location of said mobile terminal within said cellular network when said MSC/VLR determines that said current positioning can be performed, said positioning data being used to determine real-time location information for said mobile terminal.

14. The telecommunications system of claim 13, wherein said MSC/VLR stores said real-time location information and said associated time stamp within said subscriber database and sends said real-time location information and said associated time stamp to said gateway mobile location center.

15. The telecommunications system of claim 13, further comprising a serving mobile location center connected to said MSC/VLR, said positioning data being forwarded from said MSC/VLR to said serving mobile location center to determine said real-time location information.

16. The telecommunications system of claim 15, wherein said subscriber database is within said serving mobile location center, said serving mobile location center storing said real-time location information and said associated time stamp within said subscriber database.

17. The telecommunications system of claim 9, wherein said subscriber database is within said home location register.

18. A method for providing location information for a mobile terminal within a cellular network even when said mobile terminal is not able to be positioned, said method comprising the steps of:

storing within a subscriber database associated with said mobile terminal both historical location information and an associated time stamp associated with a previous positioning of said mobile terminal;

receiving, by a gateway mobile location center, a request for a current positioning of said mobile terminal from a requesting application;

forwarding, by said subscriber database, said historical location information to said gateway mobile location center when said current positioning cannot be performed; and sending, by said gateway mobile location center, said historical location information and an associated age determined from said associated time stamp to said requesting application.

19. The method of claim 18, further comprising the steps of:

storing within a home location register subscriber information related to said mobile terminal;

in response to said step of receiving, sending, by said gateway mobile location center, a routing request for routing information to said home location register;

checking, by said home location register, said subscriber information to determine whether said routing information is available;

if said routing information is available, forwarding said routing information from said home location register to said gateway mobile location center; and if said routing information is not available, sending, by said home location register, a message indicating that said mobile terminal is purged to said gateway mobile location center.

20. The method of claim 19, further comprising the steps of:

receiving, by a mobile switching center/visitor location register (MSC/VLR) in communication with said home location register, said request for said current positioning of said mobile terminal from said gateway mobile location center; and determining, by said MSC/VLR, whether said current positioning can be performed.

21. The method of claim 20, wherein said step of determining further comprises the steps of:

verifying that said mobile terminal allows positioning to be performed; and verifying that said mobile terminal is in wireless communication with said MSC/VLR, said current positioning being performed when said verifications have been made.

22. The method of claim 21, wherein said step of verifying that said mobile terminal allows positioning further comprises the step of:

checking, by said MSC/VLR, said subscriber information sent from said home location register to said MSC/VLR to determine whether said mobile terminal allows positioning.

23. The method of claim 20, further comprising, in response to said determination that said current positioning can be performed, the steps of:

obtaining, by said MSC/VLR, positioning data related to the location of said mobile terminal within said cellular network; and calculating real-time location information for said mobile terminal using said positioning data.

24. The method of claim 23, further comprising the step of:

storing said real-time location information and said associated time stamp within said subscriber database, said historical location information comprising said real-time location information.

25. The method of claim 24, further comprising the steps of:

receiving, by said gateway mobile location center, an additional request for an additional positioning of said mobile terminal; and sending, by said subscriber database, said historical location information and said associated time stamp to said gateway mobile location center when said additional positioning cannot be performed.

26. The method of claim 25, further comprising the step of:

determining said associated age of said historical data from the difference between a present clock value and said time stamp associated with said historical data.

* * * * *